United States Patent [19]
Suzuki et al.

[11] Patent Number: 5,127,370
[45] Date of Patent: Jul. 7, 1992

[54] INDUCTION SYSTEM FOR V TYPE ENGINE

[75] Inventors: Takamitsu Suzuki; Minoru Yonezawa, both of Iwata, Japan

[73] Assignee: Yamaha Hatsudoki Kabushiki Kaisha, Iwata, Japan

[21] Appl. No.: 669,482

[22] Filed: Mar. 14, 1991

[30] Foreign Application Priority Data

Mar. 20, 1990 [JP] Japan .................................. 2-68291
Mar. 20, 1990 [JP] Japan .................................. 2-68292

[51] Int. Cl.⁵ .......................................... F02M 35/10
[52] U.S. Cl. ................................ 123/52 MV; 123/432
[58] Field of Search ......... 123/52 M, 52 MB, 52 MC, 123/52 MV, 432

[56] References Cited

U.S. PATENT DOCUMENTS

| | | | |
|---|---|---|---|
| 4,275,698 | 6/1981 | Dennetiere | 123/432 |
| 4,643,136 | 2/1987 | Ura et al. | 123/52 M |
| 4,649,871 | 3/1987 | Hatamura et al. | 123/52 MV |
| 4,726,340 | 2/1988 | Hasegawa et al. | 123/52 M |
| 4,834,048 | 5/1989 | Adamis et al. | 123/432 |
| 4,957,071 | 9/1990 | Matsuo et al. | 123/52 MV |
| 5,010,854 | 4/1991 | Suehiro et al. | 123/52 MV |

FOREIGN PATENT DOCUMENTS

| | | | |
|---|---|---|---|
| 0140422 | 8/1983 | Japan | 123/432 |
| 0167823 | 10/1983 | Japan | 123/432 |
| 0226264 | 12/1984 | Japan | 123/432 |
| 0116022 | 6/1986 | Japan | 123/52 M |
| 0142260 | 6/1989 | Japan | 123/52 M |
| WO90/05842 | 5/1990 | PCT Int'l Appl. | 123/432 |

*Primary Examiner*—David A. Okonksy
*Attorney, Agent, or Firm*—Ernest A. Beutler

[57] ABSTRACT

An improved compact induction system for a V type engine including a pair of plenum chambers disposed in the valley of the V. The plenum chambers are shorter than the respective cylinder banks and serve high speed intake passages of the respective cylinder bank and some longer, low speed intake passages of the adjacent cylinder bank and some low speed intake passages of the other cylinder bank. All of the low speed intake passages have the same length.

35 Claims, 5 Drawing Sheets

INDUCTION SYSTEM FOR V TYPE ENGINE

BACKGROUND OF THE INVENTION

This invention relates to an induction system for an engine and more particularly to an improved induction system particularly adapted for use with V type engines.

It is well known that the design of the induction system for an internal combustion engine is extremely important in determining the performance of the engine. One common type of induction system employed for engines employs one or more plenum chambers, each of which serves respective cylinders through individual intake passages that extend from the plenum chamber to the intake ports of the engine. This type of induction system has been found to be extremely effective and provide good engine performance. However, the use of such plenum chambers and intake passages, particularly when plural plenum chambers are employed, can present problems in conjunction with the overall engine package. Both the size of the plenum chambers and the length of in the intake passages connecting them to the intake ports are determinative of the engine performance. It is, of course, desirable to provide a very compact engine. This can dictate both the size and location of the plenum chambers.

It is, therefore, a principal object of this invention to provide an improved, compact induction system for an internal combustion engine.

It is a further object of this invention to provide an induction system for an internal combustion engine embodying plenum chambers and interconnecting intake passageways serving intake ports from the plenum chambers and incorporating a compact and yet efficient system.

When plural plenum chambers are employed, it is frequently the practice to have each plenum chamber serve alternately firing cylinders of the engine so that the flow from the plenum chamber to the individual cylinders can be uniform. However, when the plenum chambers are interconnected, each to alternately firing chambers, certain problems can arise. That is, it may be difficult to provide the necessary interconnecting passageways while, at the same time, maintaining uniform length for each of the intake passages. It is important to insure substantially uniform length for the intake passages so that the charging efficiency for each cylinder will be the same.

It is, therefore, a still further object of this invention to provide an improved induction system for an internal combustion engine including at least two plenum chambers, each of which serves different cylinders of the engine and wherein the length of the intake passages interconnecting the plenum chambers with the cylinders are all substantially the same length.

In conjunction with the use of plural plenum chambers for an engine, it is advisable to position the plenum chamber in close proximity to the cylinders of the engine. When the engine is of the V type, it is desirable to position the plenum chambers in the valley between the banks of cylinders. However, this further complicates the problems as aforedescribed.

It is, therefore, a further object of this invention to provide an improved induction system for a V type engine embodying separate plenum chambers for respective cylinder of the engine.

With respect to the provision of an induction system of the engine, performance at a given speed and/or load range can be improved by tuning the length of the intake passages and the relative volumes of the plenum chambers. However, an induction system that is tuned to provide maximum performance at one running condition will not necessarily provide good performance at other running conditions. In order to obviate these difficulties, it has been proposed to employ an induction system for an engine that employs two different length runners for serving each cylinder of the engine. One runner is tuned for high speed performance and the other is tuned for lower or mid range performance. Obviously, the use of two runners complicates the induction system and further makes it difficult to meet the aforenoted objectives.

It is, therefore, a still further object of this invention to provide an improved, compact two stage induction system for an internal combustion engine.

When compound or staged induction systems are employed for engines, it is the practice to provide some form of throttling in one of the intake passages so that it will serve the cylinders only under the running condition for which it is tuned. Where multiple cylinders are employed, it is desirable to insure that all throttle valves of the same intake passages are operated simultaneously. One easy way that this can be done is to provide a single throttle valve shaft on it which all of these throttle valves are supported. However, with the type of induction systems previously proposed, the throttle valve shaft must pass through substantially all of the induction passages of the engine, regardless of whether or not there is a throttle valve in the respective induction passage, due to the layout of the engine. This obviously is detrimental, can reduce air flow and can complicate sealing.

It is, therefore, a still further object of this invention to provide an improved compound or staged induction system wherein a plurality of throttle valves can be operated simultaneously without interfering with the induction passages in which throttle valves are not required.

As a further complication, with respect to the positioning of the intake passages for a compound or staged induction system, it is necessary in some instances to provide long intake passages having a greater flow resistance and in some instances to provide shorter passages having lesser flow resistance. It is, therefore, a still further object of this invention to provide an induction system that provides such staging while maintaining a compact engine configuration.

It has been previously noted that in conjunction with the induction systems for V type engines, it is desirable to make the engine more compact by providing the plenum chambers for the engine in the valley between the cylinder banks. However, frequently it is desirable to position engine driven accessories in this same area. This can interfere with the desired size of the plenum chamber and also with the positioning of the intake passages that connect the plenum chamber to the individual cylinders.

It is, therefore, a still further object of this invention to provide an improved induction system for a V type engine including plenum chambers positioned in the valley between the banks of cylinders and wherein the plenum chambers do not extend for the full length of the engine so as to accommodate accessories also in the valley of the engine.

SUMMARY OF THE INVENTION

A first feature of this invention is adapted to be embodied in an internal combustion engine having a pair of cylinder banks each having a plurality of intake ports. A pair of plenum chambers are provided. A first series of intake passages extend from at least one intake port of each cylinder bank to one of the plenum chambers. A second series of intake passages extend from at least one intake port of each cylinder bank to the other of the plenum chambers. In accordance with this feature of the invention, the intake passages all have substantially the same length.

Another feature of the invention is adapted to be embodied in an internal combustion engine having a pair of cylinder banks each having a plurality of intake ports and defining a valley therebetween. A pair of plenum chambers are positioned in side by side relationship in the valley. A first series of intake passages extend from at least one of the intake ports of each cylinder bank to one of the plenum chambers. A second series of intake passages extend from at least one intake port of each cylinder bank to the other of the plenum chambers. In accordance with this feature of the invention, the plenum chambers are shorter in length than the adjacent cylinder banks.

Another feature of the invention is adapted to be embodied in an internal combustion engine having a plurality of intake ports formed in aligned relationship at one side thereof. A series of first intake passages extend from certain of the intake ports to an atmospheric air inlet and a series of second intake passages extend from the other of the intake ports to an atmospheric air inlet. In accordance with this feature of the invention, the centers of the first intake passages lie in a common first plane and the centers of the second intake passages lie in a common second plane that is angularly disposed to the first plane.

Yet another feature of the invention is also adapted to be embodied in an internal combustion engine having a plurality of intake ports formed in aligned relationship at one side thereof. A series of first intake passages extend from certain of the intake ports to an atmospheric air inlet and a series of second intake passages extend from the other of the intake ports to an atmospheric air inlet. There are a plurality of butterfly type throttle valves each journaled in a respective one of the first intake passages. A common throttle valve shaft to which the throttle valves is affixed extends through the first intake passages, but the intake passages are so disposed that the throttle valve shaft does not pass through any of the second intake passages.

DETAILED DESCRIPTION OF THE PREFERRED EMBODIMENT OF THE INVENTION

Figure 1:
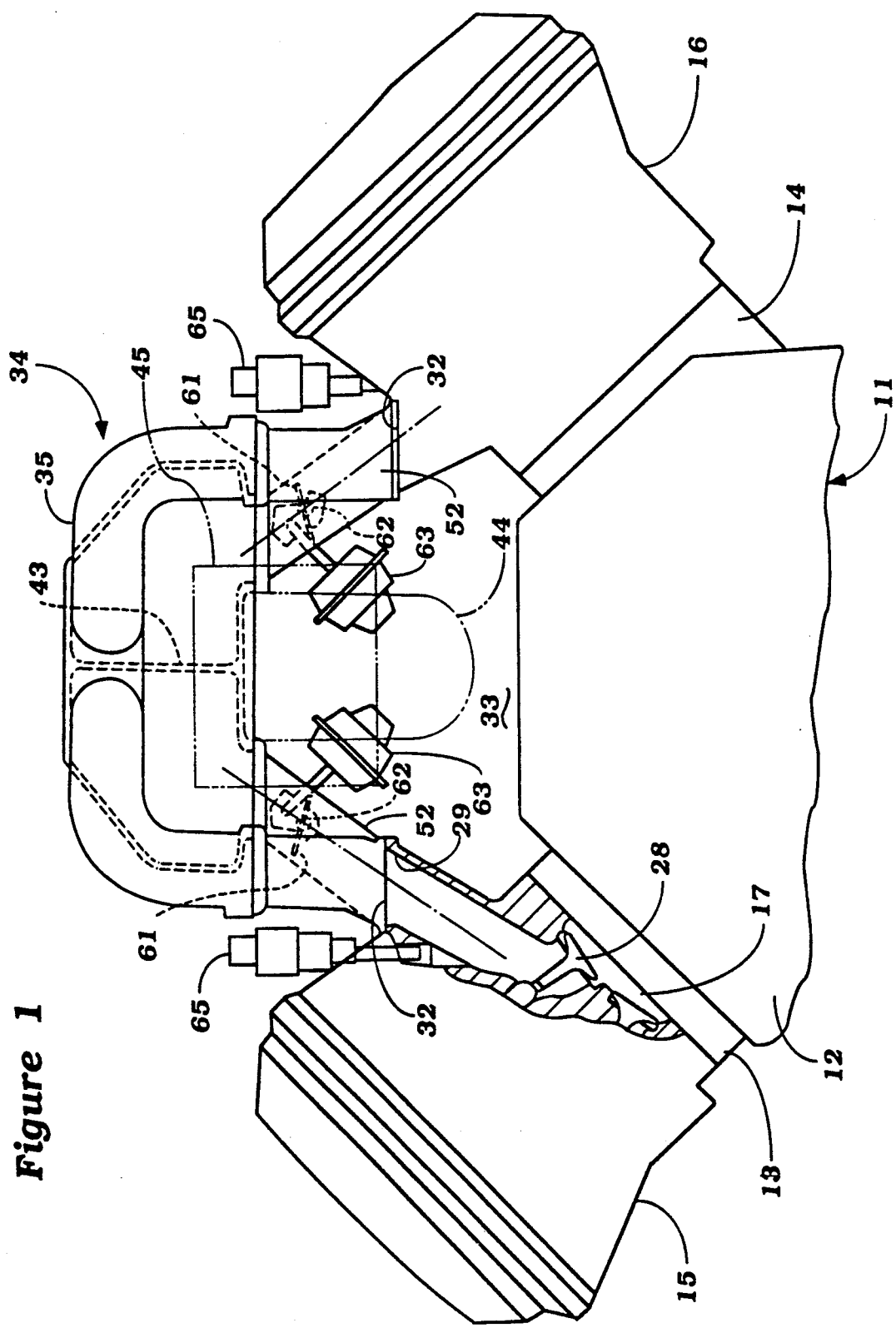
FIG. 1 is a partial front elevational view of a V type engine having an induction system constructed in accordance with an embodiment of the invention, with a portion broken away.

Referring now in detail to the drawings and initially to FIG. 1, a V type internal combustion engine operating on the four stroke cycle and having an induction system constructed in accordance with an embodiment of the invention is identified generally by the reference numeral 11 The engine 11 includes a cylinder block 12 having angularly disposed cylinder banks 13 and 14 to which respective cylinder head assemblies 15 and 16 are secured in a known manner. The cylinder block 12, cylinder banks 13 and 14 and cylinder heads 15 and 16 define a plurality of combustion chambers, one of which appears in FIG. 1 and is identified generally by the reference numeral 17. In the illustrated embodiment, the engine 11 is of the V-8 type. It is to be understood, however, that the invention may be practiced in conjunction with engines having other numbers of cylinders and also with engines having cylinder configurations other than the V type. For example, the invention may also be practiced with opposed type of engines or, in fact, certain features of the invention may be employed with inline type engines.

Since the invention deals primarily with the induction system for the engine 11, the basic constructional details of the engine may be considered to be conventional and illustration and description of them is believed to be unnecessary. As may be seen in FIG. 2, the cylinder banks 13 and 14 are staggered relative to each other, as is typical in V type engine practice, so that connecting rods of cylinders in the respective banks may be journaled on the same connecting rod throw. In this figure, the cylinder bores appear and are indicated by the reference numerals 18, 19, 22, 23, 24, 25, 26 and 27, with the cylinder bores 18, 22, 24 and 26 being in the left hand bank and the cylinder bores 19, 23, 25 and 27 being in the right hand bank. In the particular engine arrangement described, the firing order is 18, 27, 25, 24, 23, 22, 26, 19. This would correspond to a firing order of 1, 8, 6, 5, 4, 3, 7, 2, if the cylinders are numbered as 1=18; 2=19; 3=22; 4=23; 5=24; 6=25; 7=26; 8=27.

The reason for this firing sequence, as will be described, is such that successive firings will be served from successive of the two plenum chambers of the induction system.

In the preferred embodiment of the invention, the engine 11 is provided with four valves per cylinder which comprise two exhaust valves (not shown) and two intake valves, one of which appears in FIG. 1 and is identified by the reference numeral 28. One of the intake valves 28 for each of the cylinders 18, 19, 22, 23, 24, 25, 26 and 27 controls the flow through a primary intake port 29 formed in the respective cylinder head 15 or 16 while the other controls the flow through a secondary or high speed intake port 31. In accordance with the invention, the intake ports 29 and 31 for each cylinder extend through the cylinder head from the combustion chamber 17 and terminate in a generally horizontally extending surface 32 formed on the inner side of the cylinder heads 15 and 16. These surfaces 32 lie in the valley 33 formed between the cylinder banks, but face upwardly, as aforenoted. The centers of the intake ports 29 and 31 all lie in substantially common planes for each of the cylinder heads 15 and 16.

Figure 2:
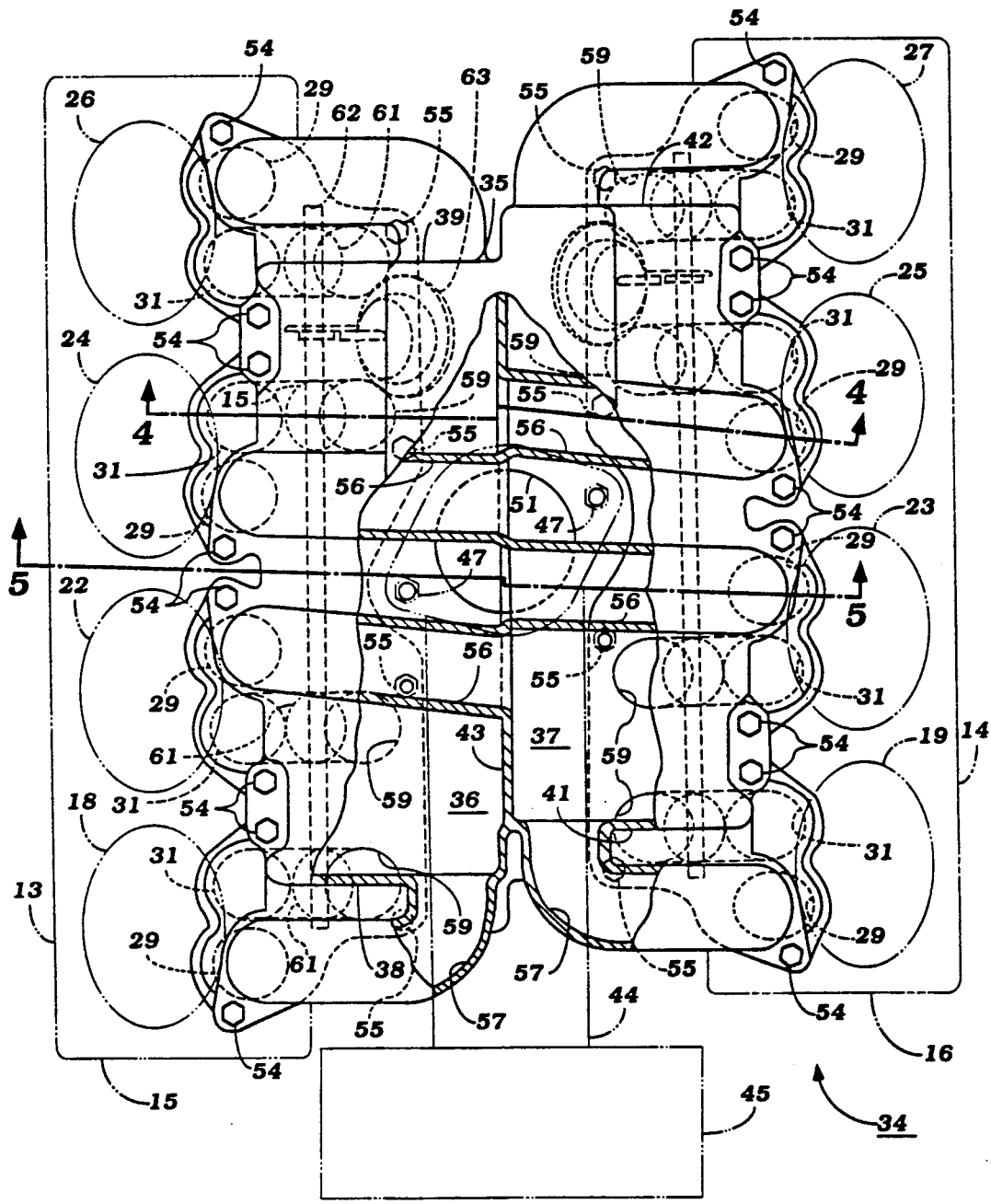
FIG. 2 is a top plan view showing the induction system in relation to the cylinder banks, which are shown in phantom, and to the intake device, also shown in phantom, with portions broken away.
Figure 3:
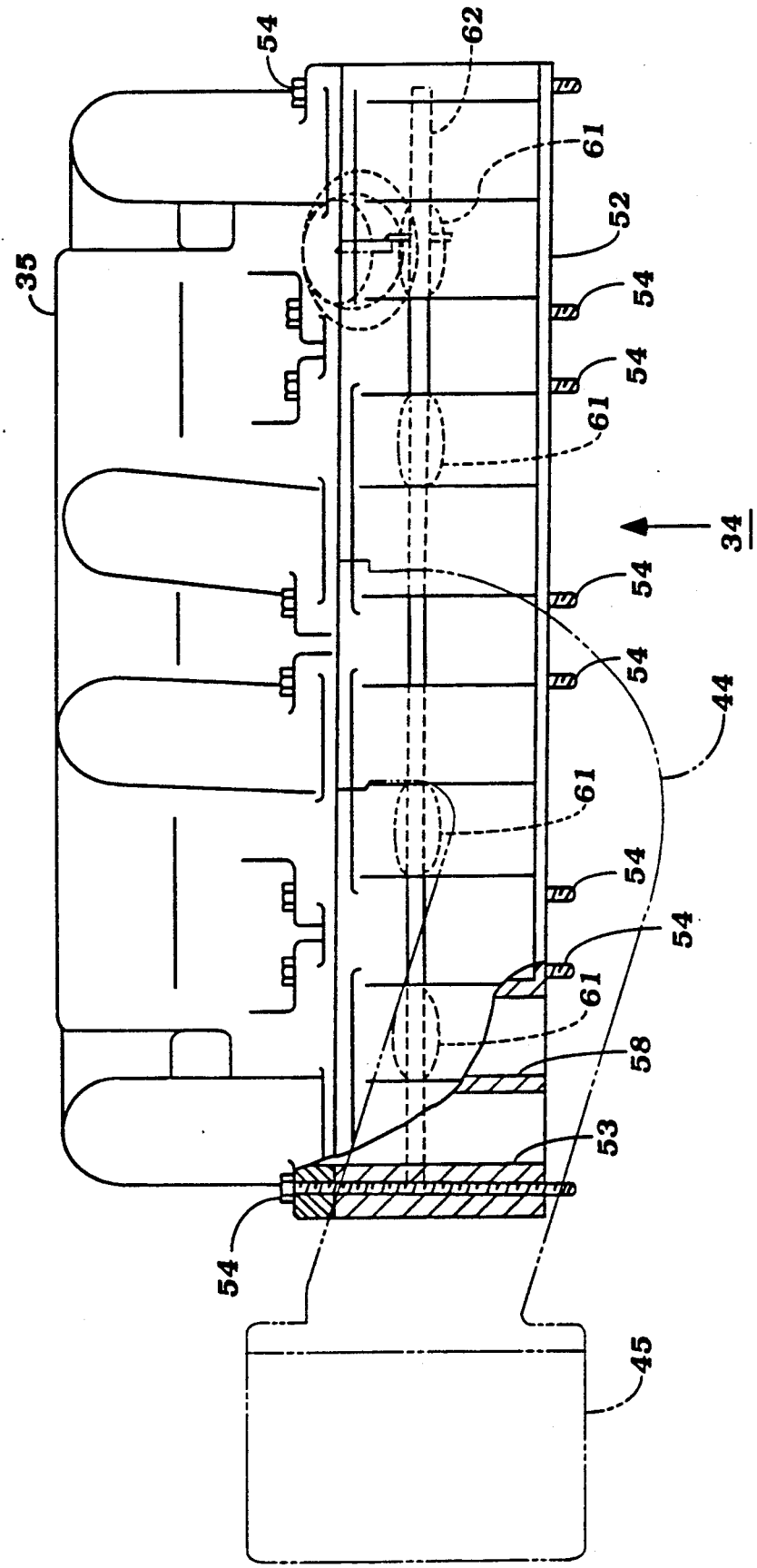
FIG. 3 is a side elevational view of the induction system, with the intake device shown in phantom.

The spacing of the intake ports 29 and 31 of the respective cylinders 18, 19, 22, 23, 24, 25, 26 and 27 is as shown in FIG. 2 and this spacing is such that primary intake ports 29 of the cylinders 18, 19, 26 and 27 are adjacent the opposite ends of the engine for a reason which will become apparent. For the center two cylinders of each cylinder bank, 22, 24 and 23, 25, the primary intake ports 29 are adjacent to each other.

An induction system constructed in accordance with an embodiment of the invention and identified generally by the reference numeral 34 is provided for delivering a charge to the intake ports 29 and 31. This induction system 34 is designed so as to provide a relatively long intake passage for the primary intake ports 29 that is designed so as to improve low and mid range running performance and a relatively short intake passage to the intake ports 31 so as to provide tuning for improved high speed performance. It should be noted that although the invention is described in conjunction with an arrangement having separate primary and secondary intake ports in the cylinder heads 15 and 16, the invention may also be practiced in conjunction with engines having siamese intake passages or only a single intake passage for each cylinder. However, the described system is particularly effective when separate intake ports 29 and 31 are provided for each cylinder.

The induction system 34 is designed so as to nest in the valley 33 between the cylinder banks 13 and 14 and specifically between the cylinder heads 15 and 16. Also, the configuration is such that the induction system 34 will have a relatively low height so as to facilitate a low hood line and also so as to permit the engine 11 to be placed transversely in an engine compartment of an associated motor vehicle.

The induction system 34 includes a main casting assembly, indicated generally by the reference numeral 35 and which defines a pair of longitudinally extending plenum chambers 36 and 37 which extend in side by side relationship through the valley 33. As may be readily seen in FIG. 2, the plenum chamber 36 has front and rear walls 38 and 39 that are spaced apart a distance that is less than the length of the adjacent cylinder head 15 so as to provide a compact assembly. In a similar manner, the plenum chamber 37 has front and rear walls 41 and 42 which also are spaced apart a lesser distance than the length of the cylinder head 16. The plenum chambers 36 and 37 are separated from each other, in the illustrated embodiment, by a vertically extending wall 43 and the plenum chambers 36 and 37 are staggered relative to each other as are the cylinder banks 13 and 14, as aforenoted.

Figure 5:
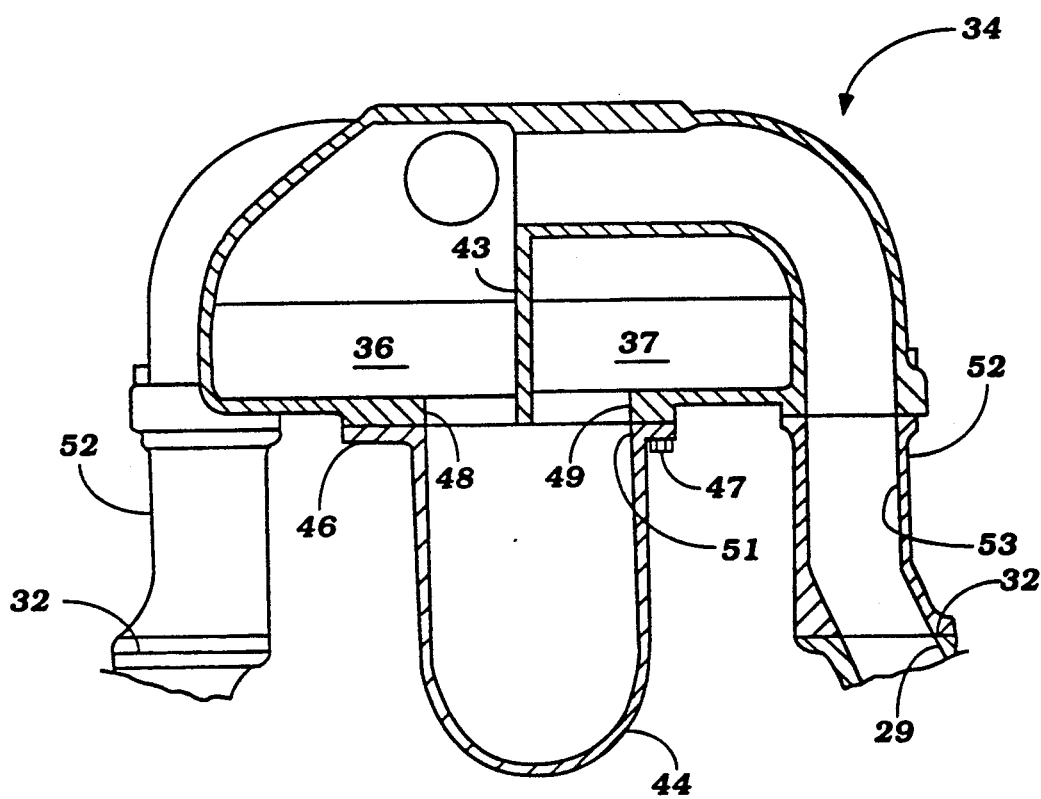
FIG. 5 is a cross sectional view taken along the line 5—5 of FIG. 2.

An intake device comprised of an air inlet conduit, shown in phantom in all figures except for FIG. 5 and indicated generally by the reference numeral 44 lies beneath the main casting 35 and extends from the forward end of the engine where it is affixed to a throttle body 45 in which a main throttle valve (not shown) is positioned. The throttle body 45, in turn, receives filtered air from an air cleaner (not shown).

The intake device 44 has a flange portion 46 that is affixed to the underside of the main casting 34 by means of a plurality of threaded fasteners 47 and supplies air to the individual plenum chambers 36 and 37 through intake openings 48 and 49. The intake openings 48 and 49 are separated from each other by a portion of the wall 43. Hence a single intake opening 51 is actually formed in the upper surface of the intake device 44.

A pair of manifold forming members 52 is provided with each manifold forming member 52 being interposed between the cylinder head surface 32 and a downwardly facing outer side surface of the main casting member 35. The manifold forming members 52 form portions of first and second intake passages that serve the cylinder head intake ports 29 and 31 respectively. The first intake passage is comprised of a generally vertically extending passage 53 formed integrally in the manifold forming members 52 and which extends generally perpendicularly to the cylinder head surface 32. A plurality of threaded fasteners 54 hold the main casting member 35 to the manifold forming members 52 and to the cylinder heads 15 and 16 so as to provide a unitary assembly when fastened together.

Threaded fasteners 55 extend upwardly through flanges formed on the lower surfaces of the manifold forming member 52 for affixing the manifold forming members to the main casting 35. As a result, the main casting member 35 and manifold forming members 52 can form a sub assembly which can be bolted as a unit to the remainder of the engine.

Figure 4:
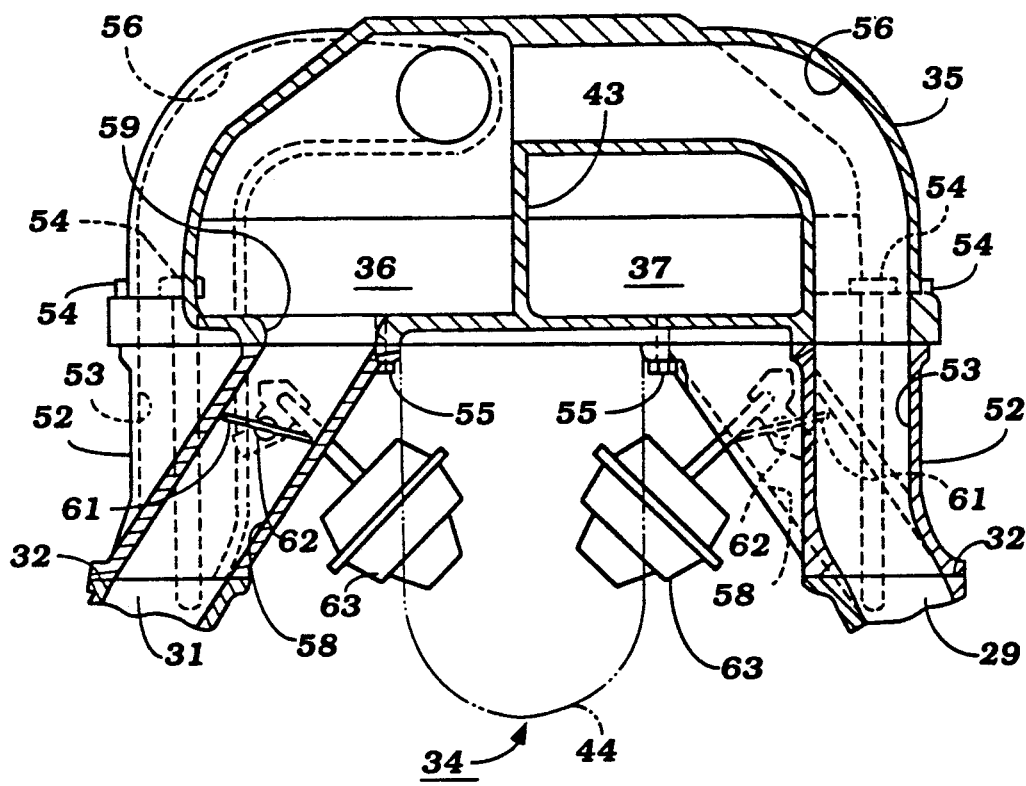
FIG. 4 is a cross sectional view taken along the line 4—4 of FIG. 2.

The passages 53 of the manifold forming section 52 associated with the center two cylinders of each bank, 22, 24 and 23, 25, communicate with generally L shaped intake passages 56 that are comprised of a vertically extending section and a horizontally extending section formed in the plenum chambers 36 and 37 adjacent the respective cylinder bank. These passages 56 then terminate in openings in the vertically extending wall 43 so that those passages 56 that run through the plenum chamber 36 communicate at their inlet ends with the plenum chamber 37 and those passages 56 which run through the plenum chamber 37 communicate with the plenum chamber 36. This relationship can clearly be seen in FIGS. 4 and 5.

The end cylinders 18, 26 and 19, 27 of each cylinder bank 13 and 14 communicate with the adjacent plenum chambers 36 and 37 through passageways that extend vertically upwardly, horizontally and then turn inwardly. These passageways are identified by the reference numerals 57 and may be best seen in FIG. 2. In this way, the passageways 56 and 57 for each cylinder can have the same length while permitting the use of relatively short plenum chambers 36 and 37. This permits a more compact assembly and furthermore opens up some of the area of the valley 33 so as to accommodate engine accessories.

In addition to the primary, first, low speed induction passages formed by the manifold sections 53 and plenum chamber sections 56 or 57, there are provided relatively short, high speed induction passages. These induction passages are formed solely by the manifold forming section 52 and are comprised of angularly disposed passages 58 that are generally aligned with the center of the secondary cylinder head passages 31 and which communicate with the plenum chambers 36 and 37 adjacent the respective cylinder head 15 or 16 through openings 59 formed in the lower wall of the main casting member 35. The centers of the passages 58 associated with each plenum chamber 36 or 37 are disposed in a common plane that is at an angle to the plane of the vertically extending sections 53. As a result, the passages 58 are staggered relative to the passages 53. This provides a short, straight, high speed passage communicating with the plenum chambers 36 and 37 and also provides another advantage, now to be described.

Since the induction passages 58 are designed to provide improved high speed running, it is desirable to maintain these passages in a closed position except under high speed running. To this end, there are provided butterfly type throttle valves 61 positioned in the passages 58 of each of the manifold forming sections 52. These butterfly type throttle valves 61 are each affixed to a respective throttle valve shaft 62 that passes through and is journaled within the manifold forming sections 52. However, as may be readily apparent from FIG. 4, due to the angular relationship of the passages 58, the throttle valve shafts 62 do not pass through the induction passages 53. Hence, there will be no flow restriction in these other passages as with prior art type of constructions. There is no problem in sealing the throttle valve shaft 62 in these other passages which are not penetrated. Vacuum type servo motors 63 are connected to the throttle valve shaft 61 and may be responsive to engine load via an intake manifold vacuum signal so as to open the throttle valve 61 when the engine is operating under high speed, high load condition.

The compact configuration of the induction system as thus far described permits fuel injection nozzles 65 to be mounted in the cylinder heads 15 and 16 to spray into a common passage that serves both of the intake ports 29 and 31 between the induction system 38 and the respective cylinder heads 15 and 16. This affords easy access and maintains easy serviceability.

It should be readily apparent from the foregoing description that the described induction system is extremely compact and yet facilitates the formation of both high and low speed induction passages for each cylinder of the engine without interference with each other, while maintaining uniform length for all of the high and low speed induction passages and which can easily be assembled and fabricated. In the illustrated embodiment, the plenum chambers 36 and 37 are completely isolated from each other. If desired, it is possible to provide a communicating passageway between the plenum chambers 36 and 37 that are closed under certain running conditions and open under high speed running conditions so as to further improve the high speed performance of the engine.

As has been previously noted, the firing order of the engine is chosen so that the cylinder served by the low speed intake passages from the plenum chambers 36 and 37 alternate with each other. Hence there is no interference or pulsation generated that would impair induction efficiency. Of course, the foregoing description is that of a preferred embodiment of the invention. Various changes and modifications may be made without departing from the spirit and scope of the invention, as defined by the appended claims.

We claim:

1. An internal combustion engine having a pair of cylinder banks each having a plurality of intake ports, a pair of plenum chambers, each adjacent a respective cylinder head, a series of first intake passages extending from at least one intake port of each cylinder bank to the adjacent one of said plenum chambers, and a series of second intake passages extending from at least one intake port of each cylinder bank to the other of said plenum chambers, said intake passages all having substantially the same length, said first intake passages extending from the end cylinders of the respective bank to the ends of the adjacent one of the plenum chambers.

2. An internal combustion engine as set forth in claim 1 wherein the second intake passages extend from the center intake ports of the respective cylinder bank into center of the other of the plenum chambers.

3. An internal combustion engine having a pair of cylinder banks each having a plurality of intake ports, a pair of plenum chambers, each adjacent a respective cylinder head, a series of first intake passages extending from at least one intake port of each cylinder bank to the adjacent one of said plenum chambers, and a series of second intake passages extending from at least one intake port of each cylinder bank to the other of said plenum chambers, said intake passages all having substantially the same length, said second intake passages extending from the center intake ports of the respective cylinder into center of the other of the plenum chambers.

4. An internal combustion engine having a pair of cylinder banks each having a plurality of intake ports, a pair of plenum chambers, each adjacent a respective cylinder head, a series of first intake passages extending from at least one intake port of each cylinder bank to the adjacent one of said plenum chambers, a series of second intake passages extending from at least one intake port of each cylinder bank to the other of said plenum chambers, said intake passages all having substantially the same length, and a series of third intake passages extending from further intake passages of each of the cylinder banks to the adjacent one of the plenum chambers.

5. An internal combustion engine as set forth in claim 4 wherein the third intake passages each serve a cylinder served by either the one of the first intake passages or one of the second intake passages.

6. An internal combustion engine as set forth in claim 5 further including throttle valve means in the further intake passages for controlling the flow therethrough.

7. An internal combustion engine as set forth in claim 6 wherein the throttle valve means of the further intake passages for each cylinder bank are all affixed to a common shaft and that common shaft does not pass through any of the first or second intake passages.

8. An internal combustion engine as set forth in claim 7 wherein the third intake passages of each of the cylinder banks have their centers lying in a common plane that is disposed at an angle to a common plane containing the centers of the first and second intake passages of the respective cylinder bank.

9. An internal combustion engine as set forth in claim 5 wherein the first intake passages extend from the end cylinders of the respective banks to the ends of the adjacent one of the plenum chambers.

10. An internal combustion engine as set forth in claim 9 wherein the second intake passages extend from the center intake ports of the respective cylinder banks into the center of the other of the plenum chambers.

11. An internal combustion engine having a pair of cylinder banks each having a plurality of intake ports, a pair of plenum chambers, each adjacent a respective cylinder head, a series of first intake passages extending from at least one intake port of each cylinder bank to the adjacent one of said plenum chambers, a series of second intake passages extending from at least one intake port of each cylinder bank to the other of said plenum chambers, said intake passages all having substantially the same length, said cylinder banks being disposed at an angle to each other and define a valley therebetween, said plenum chambers extending through said valley in side by side relationship.

12. An internal combustion engine as set forth in claim 11 further including an atmospheric air inlet to each of the plenum chambers extending beneath the plenum chambers.

13. An internal combustion engine as set forth in claim 12 wherein the atmospheric air inlet for each plenum chamber is served by a common throttle body having a single manually positioned throttle valve therein.

14. An internal combustion engine as set forth in claim 13 wherein the first intake passages extend from the end cylinders of the respective banks to the ends of the adjacent one of the plenum chambers.

15. An internal combustion engine as set forth in claim 14 wherein the second intake passages extend from the center intake ports of the respective cylinder banks into the center of the other of the plenum chambers.

16. An internal combustion engine as set forth in claim 13 wherein the second intake passages extend from the center intake ports of the respective cylinder banks into the center of the other of the plenum chambers.

17. An internal combustion engine as set forth in claim 13 further including a series of further intake passages extending from other intake passages of each of the cylinder banks to the adjacent plenum chamber.

18. An internal combustion engine as set forth in claim 17 wherein the third intake passages each serve a cylinder served by either the one of the first intake passages or one of the second intake passages.

19. An internal combustion engine as set forth in claim 18 further including throttle valve means in the third intake passages for controlling the flow therethrough.

20. An internal combustion engine as set forth in claim 19 wherein the throttle valve means of the further intake passages for each cylinder bank are all affixed to a common shaft and that common shaft does not pass through any of the first or second intake passages.

21. An internal combustion engine as set forth in claim 20 wherein the further intake passages of each of the cylinder banks have their centers lying in a common plane that is disposed at an angle to a common plane containing the centers of the first and second intake passages of the respective cylinder bank.

22. An internal combustion engine as set forth in claim 18 wherein the first intake passages extend from the end cylinders of the respective banks to the ends of the adjacent one of the plenum chambers.

23. An internal combustion engine as set forth in claim 22 wherein the second intake passages extend from the center intake ports of the respective cylinder banks into the center of the other of the plenum chambers.

24. An internal combustion engine as set forth in claim 11 wherein the plenum chambers are formed from a common member.

25. An internal combustion engine as set forth in claim 24 wherein at least a portion of the second intake passages are formed by the same common member as the plenum chambers.

26. An internal combustion engine as set forth in claim 11 wherein the plenum chambers are shorter in length than the respective cylinder banks.

27. An internal combustion engine as set forth in claim 26 wherein the first intake passages extend from the end cylinders of the respective banks to the one of ends of the adjacent the plenum chambers.

28. An internal combustion engine as set forth in claim 27 wherein the second intake passages extend from the center intake ports of the respective cylinder banks into the center of the other of the plenum chambers.

29. An internal combustion engine as set forth in claim 26 wherein the second intake passages extend from the center intake ports of the respective cylinder banks into the center of the other of the plenum chambers.

30. An internal combustion engine having a plurality of intake ports formed in aligned co-planar relation at one side thereof, said intake ports being formed in at least pairs comprised of first and second intake ports each serving a common cylinder in said engine, a series of first intake passages extending from the first of said intake ports to an atmospheric air inlet, a series of second intake passages extending from the first of said intake ports to an atmospheric air inlet, a series of second intake passages lying in a common first plane, the center of said second intake passages lying in a common second plane angularly disposed to said first plane, and throttle valve means positioned in each of said second intake passages, said throttle valve means each comprise butterfly type throttle valve, all affixed to a common throttle valve shaft, and said throttle valve shaft does not pass through the first intake passages.

31. An internal combustion engine as set forth in claim 30 wherein the plurality of intake ports are formed in a first cylinder bank of a V type engine and further including a second cylinder bank defining a V with the first cylinder bank and having a plurality of pairs of first and second intake ports formed in aligned relationship at one side thereof and served by a series of first and second intake passages, as defined.

32. An internal combustion engine as set forth in claim 31 wherein the atmospheric air inlets comprise a pair of plenum chambers disposed in the valley between the banks of cylinders.

33. An internal combustion engine having a plurality of intake ports formed in aligned relation at one side thereof, a series of first intake passages extending from at least one of said intake ports to an atmospheric air inlet, and a series of second intake passages extending from at least another of said intake ports to an atmospheric air inlet, and a plurality of butterfly type throttle valves, each journaled in a respective one of the second intake passages, a common throttle valve shaft to which said throttle valves are all affixed, said first and said second intake passages being disposed so that said throttle valve shaft does not pass through any of the first intake passages.

34. An internal combustion engine as set forth in claim 33 wherein the plurality of intake ports are formed in a first cylinder bank of a V type engine and further including a second cylinder bank defining a V with the first cylinder bank and having a plurality of intake ports formed in aligned relationship at one side thereof and served by a series of first and second intake passages.

35. An internal combustion engine as set forth in claim 34 wherein the atmospheric air inlets comprise a pair of plenum chambers disposed in the valley between the banks of cylinders.

* * * * *

UNITED STATES PATENT AND TRADEMARK OFFICE
CERTIFICATE OF CORRECTION

PATENT NO. : 5,127,370
DATED : July 7, 1992
INVENTOR(S) : Suzuki, et al

It is certified that error appears in the above-identified patent and that said Letters Patent is hereby corrected as shown below:

Column 8, line 10, Claim 3, after "cylinder" insert --bank--.

Column 9, line 64, Claim 27, delete "one of".

Column 9, line 65, Claim 27, after "adjacent" insert --one of--.

Column 10, line 18, Claim 30, "first" should be --second--.

Column 10, lines 19-20, Claim 30, "a series of second" should be --the centers of said first--.

Column 10, line 60, Claim 34, after "passages" insert --as defined in claim 33--.

Signed and Sealed this

Twenty-sixth Day of October, 1993

Attest:

BRUCE LEHMAN

*Attesting Officer*   *Commissioner of Patents and Trademarks*